US012808418B2

(12) United States Patent
Suzuki et al.

(10) Patent No.: US 12,808,418 B2
(45) Date of Patent: Nov. 24, 2026

(54) AXLE BRACKET AND FRONT FORK FOR SADDLE-RIDING VEHICLE PROVIDED WITH SAME

(71) Applicant: Hitachi Astemo, Ltd., Hitachinaka (JP)

(72) Inventors: Yuto Suzuki, Hitachinaka (JP); Isao Morishita, Hitachinaka (JP)

(73) Assignee: Hitachi Astemo, Ltd., Hitachinaka (JP)

(*) Notice: Subject to any disclaimer, the term of this patent is extended or adjusted under 35 U.S.C. 154(b) by 234 days.

(21) Appl. No.: 18/848,003

(22) PCT Filed: Mar. 10, 2023

(86) PCT No.: PCT/JP2023/009194
§ 371 (c)(1),
(2) Date: Sep. 17, 2024

(87) PCT Pub. No.: WO2023/176706
PCT Pub. Date: Sep. 21, 2023

(65) Prior Publication Data

US 2025/0043838 A1 Feb. 6, 2025

(30) Foreign Application Priority Data

Mar. 18, 2022 (JP) ................................ 2022-043319
May 13, 2022 (WO) .................. PCT/JP2022/020158

(51) Int. Cl.
*B62K 21/02* (2006.01)
*B62K 25/08* (2006.01)
(Continued)

(52) U.S. Cl.
CPC ............ *F16D 65/847* (2013.01); *B62K 21/02* (2013.01); *B62L 1/005* (2013.01);
(Continued)

(58) Field of Classification Search
CPC .... F16D 65/847; F16D 65/0081; F16D 65/18; B62K 21/02; B62K 25/08; B62L 1/005
See application file for complete search history.

(56) References Cited

U.S. PATENT DOCUMENTS

2008/0135360 A1 6/2008 Paulik
2020/0407006 A1* 12/2020 Kuwabara .............. B62J 45/423

FOREIGN PATENT DOCUMENTS

DE 19608177 A1 * 9/1997 ................ B60T 5/00
GB 2237854 A * 5/1991 .............. B62J 23/00
(Continued)

OTHER PUBLICATIONS

German Office Action mailed Jan. 16, 2026 for the corresponding German Patent Application No. 112023001538.4: Total 8 pages including English translation.
(Continued)

*Primary Examiner* — Jacob D Knutson
(74) *Attorney, Agent, or Firm* — Leason Ellis LLP; Edward J. Ellis; Melvin C. Garner

(57) ABSTRACT

An axle bracket includes a coupling portion that couples a damper to an axle, and a brake attachment portion that is provided on a rear side of a vehicle with respect to the coupling portion. The brake attachment portion allows a brake to be attached. At least the coupling portion includes a first introduction portions capable of guiding a traveling wind from a front of the coupling portion to a rear of the coupling portion. The first introduction portion is provided such that the brake 21 and a path of the traveling wind passing through the first introduction portion intersect each other.

8 Claims, 18 Drawing Sheets

(51) Int. Cl.

| | |
|---|---|
| ***B62L 1/00*** | (2006.01) |
| ***F16D 65/00*** | (2006.01) |
| ***F16D 65/847*** | (2006.01) |
| *F16D 65/18* | (2006.01) |

(52) U.S. Cl.
CPC .......... *F16D 65/0081* (2013.01); *B62K 25/08* (2013.01); *F16D 65/18* (2013.01)

(56) References Cited

FOREIGN PATENT DOCUMENTS

| | | | | | |
|---|---|---|---|---|---|
| JP | 02227388 | A | | 9/1990 | |
| JP | H03204384 | A | * | 9/1991 | |
| JP | 07089474 | A | | 4/1995 | |
| JP | 2008120243 | A | * | 5/2008 | .............. G01P 1/026 |
| JP | 2011057113 | A | * | 3/2011 | |

OTHER PUBLICATIONS

International Search Report mailed May 16, 2023 for the corresponding PCT International Patent Application No. PCT/JP2023/009194 (5 pages including English translation).

* cited by examiner

AXLE BRACKET AND FRONT FORK FOR SADDLE-RIDING VEHICLE PROVIDED WITH SAME

CROSS-REFERENCE TO RELATED APPLICATIONS

This application is a U.S. National Phase Application under 35 U.S.C. § 371 of International Patent Application No. PCT/JP2023/009194 filed on Mar. 10, 2023, and claims the benefit of priority to International Application No. PCT/JP2022/020158 filed on May 13, 2022 and Japanese Patent Application No. 2022-043319 filed on Mar. 18, 2022, the contents of all of which are incorporated herein by reference in their entireties. The International Application was published in Japanese on Sep. 21, 2023 as International Publication No. WO/2023/176706 under PCT Article 21(2).

TECHNICAL FIELD

The present invention relates to an axle bracket and a front fork particularly suitable for use in a saddle-riding vehicle on which a rider straddles.

BACKGROUND ART

A saddle-riding vehicle such as a motorcycle includes an axle bracket on a front fork that steers a front wheel. The axle bracket includes a coupling portion that couples a damper to an axle, and a brake attachment portion to which a brake (a brake caliper) is allowed to be attached. The brake generates heat during braking, and a technique of cooling the brake by a traveling wind has been developed. As a method for cooling the brake, a means of adding an air duct around the axle bracket is generally adopted. Such a technique of cooling the brake by using the air duct is known from, for example, JPH02-227388A and JPH07-089474A.

The brake cooling technique known from JPH02-227388A is to cool a brake by blowing a traveling wind taken in from an air duct provided below a front fender and an air duct provided below a front fork to a brake disc and a brake caliper.

In the brake cooling technique known from JPH07-089474A, a traveling wind intake port (corresponding to an air duct) is provided at a front end portion of a front fender, and a traveling wind taken in from the traveling wind intake port is guided to a brake disc of a front wheel by a traveling wind deflecting portion.

CITATION LIST

Patent Literature

Patent Literature 1: JPH02-227388A
Patent Literature 2: JPH07-089474A

Technical Problem

However, depending on the type of the saddle-riding vehicle, the means of adding the air duct around the axle bracket may be limited. Since the brake is provided behind the axle bracket, a traveling wind generated during traveling of the saddle-riding vehicle is affected by the axle bracket. Even in this case, the brake is required to be efficiently cooled.

An object of the present invention is to provide a technique capable of efficiently cooling a brake in an axle bracket including a coupling portion that couples a damper to an axle and a brake attachment portion to which the brake is allowed to be attached.

SUMMARY OF THE INVENTION

Solution to Problem

As a result of earnest studies, the present inventor has focused on a fact that a brake attachment portion to which a brake is allowed to be attached is provided at a rear portion of a coupling portion that couples a damper to an axle, and a part of a fluid such as a traveling wind generated during traveling of a vehicle such as a saddle-riding vehicle is blocked by the coupling portion. Then, it has been found that the fluid can be efficiently caused to flow to the brake by providing an introduction portion capable of guiding the fluid in a front and rear direction of the vehicle in the coupling portion. The present invention was completed based on these findings.

The present disclosure provides an axle bracket including:

a coupling portion configured to couple a damper to an axle; and a brake attachment portion provided on a rear side of a vehicle with respect to the coupling portion, and to which a brake is allowed to be attached, in which at least the coupling portion includes a first introduction portion configured to guide a traveling wind from a front of the coupling portion to a rear of the coupling portion, and the first introduction portion is provided such that a path of the traveling wind passing through the first introduction portion intersects with the brake.

Advantageous Effects of Invention

The present disclosure can provide a technique capable of efficiently cooling the brake in the axle bracket including the coupling portion that couples the damper to the axle and the brake attachment portion to which the brake is allowed to be attached.

BRIEF DESCRIPTION OF THE DRAWINGS

Exemplary embodiment(s) of the present invention will be described in detail based on the following figures, wherein.

DETAILED DESCRIPTION OF THE INVENTION

Embodiments of the present invention will be described below with reference to the accompanying drawings. Embodiments illustrated in the accompanying drawings are examples of the present invention, and the present invention is not limited to the embodiments. In the description, the term "left and right" refers to the left and right with respect to a rider riding in a saddle-riding vehicle, and the term "front and rear" refers to the front and the rear with respect to a moving direction of the saddle-riding vehicle. Further, in the diagrams, Up indicates up, Dn indicates down, Fr indicates front (the moving direction, a traveling direction), Rr indicates rear (a reverse direction with respect to the moving direction), Le indicates left, and Ri indicates right.

Example 1

An axle bracket 40 of example 1 and a front fork 13 for a saddle-riding vehicle including the axle bracket 40 will be described with reference to FIGS. 1 to 5.

Figure 1:
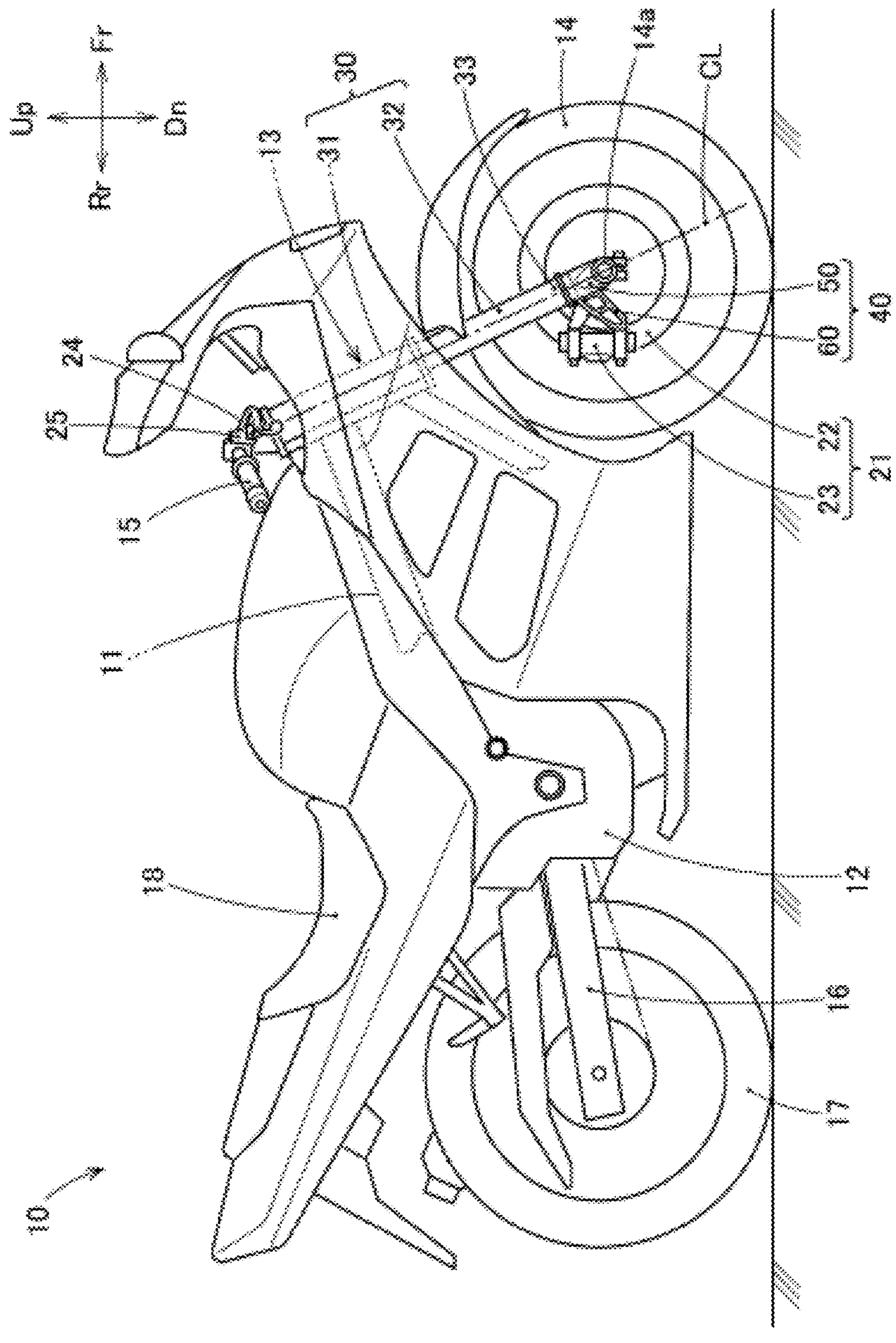
FIG. 1 is a side view of a saddle-riding vehicle including a front fork and an axle bracket according to example 1.

As illustrated in FIG. 1, the front fork 13 is used in, for example, a vehicle, and as an example, is used in a motorcycle 10, which is a type of a saddle-riding vehicle on which a rider rides. In the following, the motorcycle 10 may be referred to as a "saddle-riding vehicle 10" or a "vehicle 10".

As illustrated in FIG. 1, the motorcycle 10, which is a type of the saddle-riding vehicle, includes a vehicle body 11, an engine 12 provided at a lower portion of a center of the vehicle body 11, a front fork 13 provided at a front portion of the vehicle body 11, a front wheel 14 supported by the front fork 13, and a steering handle 15 coupled to the front fork 13.

The motorcycle 10 further includes a wheel support mechanism 16 extending rearward from a rear portion of the vehicle body 11 and swingable in an up and down direction, a rear wheel 17 supported by the wheel support mechanism 16, a rear suspension (not illustrated) bridged between the vehicle body 11 and the wheel support mechanism 16, and a rider seat 18 provided at the upper center of the vehicle body 11.

The motorcycle 10 further includes a brake 21 (a wheel brake 21) capable of braking the front wheel 14. The brake 21 is, for example, a disc brake, and includes a brake disc 22 (a brake disc rotor 22) on a rotating side fixed to the front wheel 14 and a brake caliper 23 on a fixed side. In response to an operation of a brake lever 24 provided on the steering handle 15, a brake hydraulic pressure generated from a master cylinder 25 is applied to the brake caliper 23, thereby applying a brake pressure to the brake disc 22. That is, the brake caliper 23 clamps the brake disc 22 to brake the rotation of the front wheel 14.

The front fork 13 includes two dampers 30 (shock absorber main bodies 30) provided on both sides of the front wheel 14, respectively. The damper 30 is, for example, an inverted damper implemented by a combination of an upper outer tube 31 supported by the vehicle body 11 and a lower inner tube 32 supporting the front wheel 14. A lower end portion 33 of the damper 30 (the lower end portion 33 of the inner tube 32) is coupled to an axle 14*a* of the front wheel 14 by the axle bracket 40.

Figure 2A:
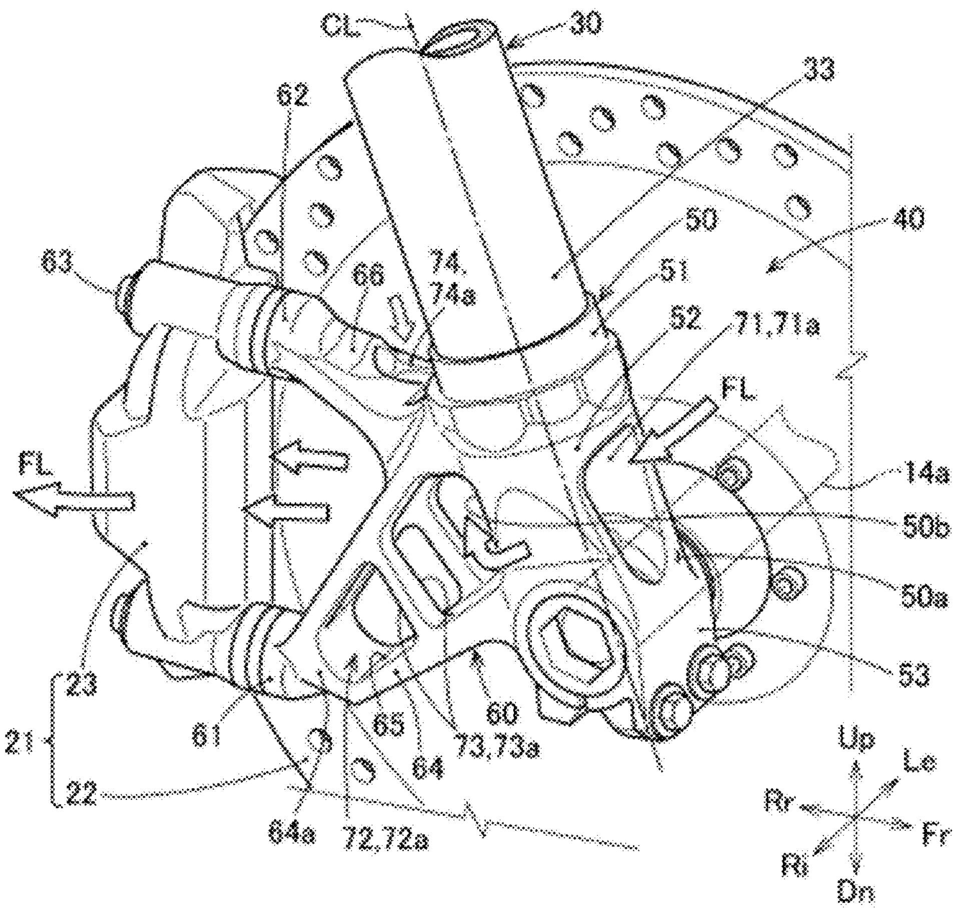
FIG. 2A is a perspective view of a configuration in which a damper and a brake caliper are assembled to the axle bracket illustrated in FIG. 1.
Figure 2B:
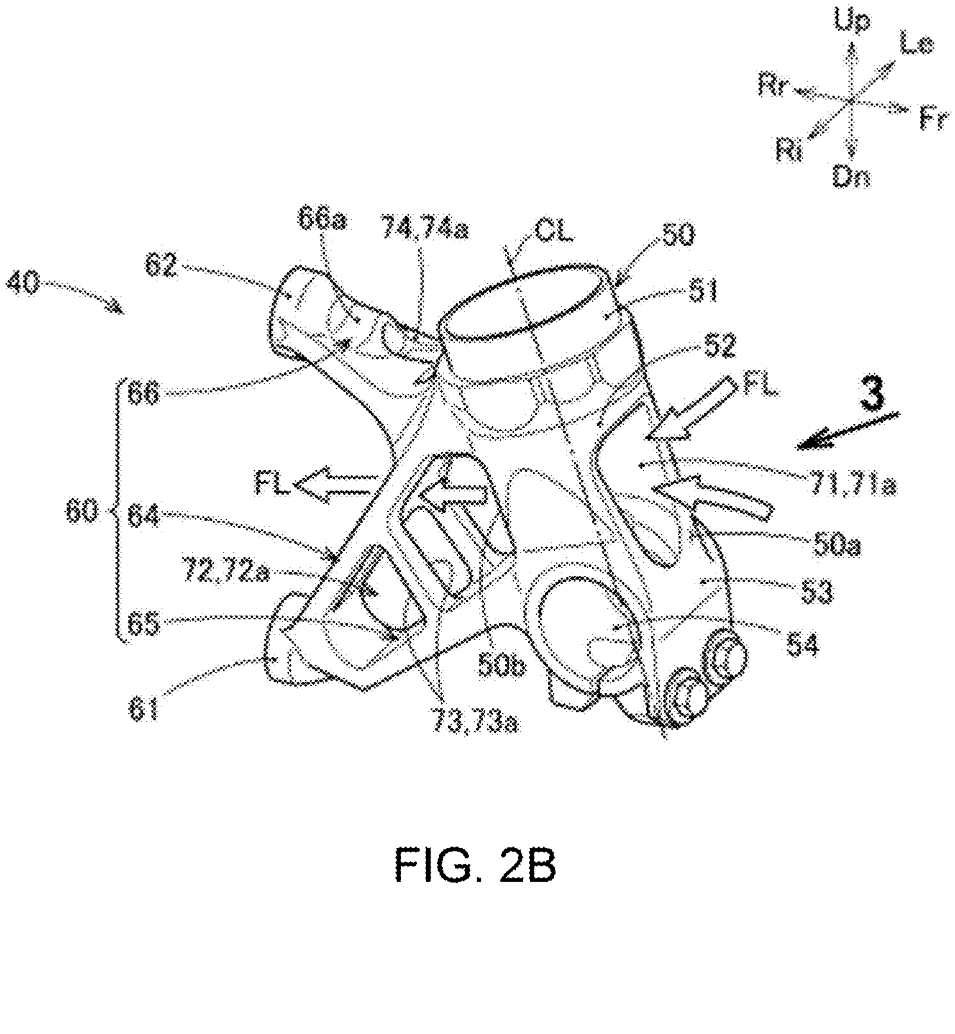
FIG. 2B is a perspective view of the single axle bracket illustrated in FIG. 2A.

In the following, the axle bracket 40 (an axle holder 40) will be described in detail. As illustrated in FIG. 2A and FIG. 2B, the axle bracket 40 includes a coupling portion 50 that couples the damper 30 to the axle 14*a*, and a brake attachment portion 60 that is provided on a rear side of the vehicle 10 (see FIG. 1) with respect to the coupling portion 50. The coupling portion 50 and the brake attachment portion 60 are formed integrally with each other or by a combination of separate members.

Figure 3:
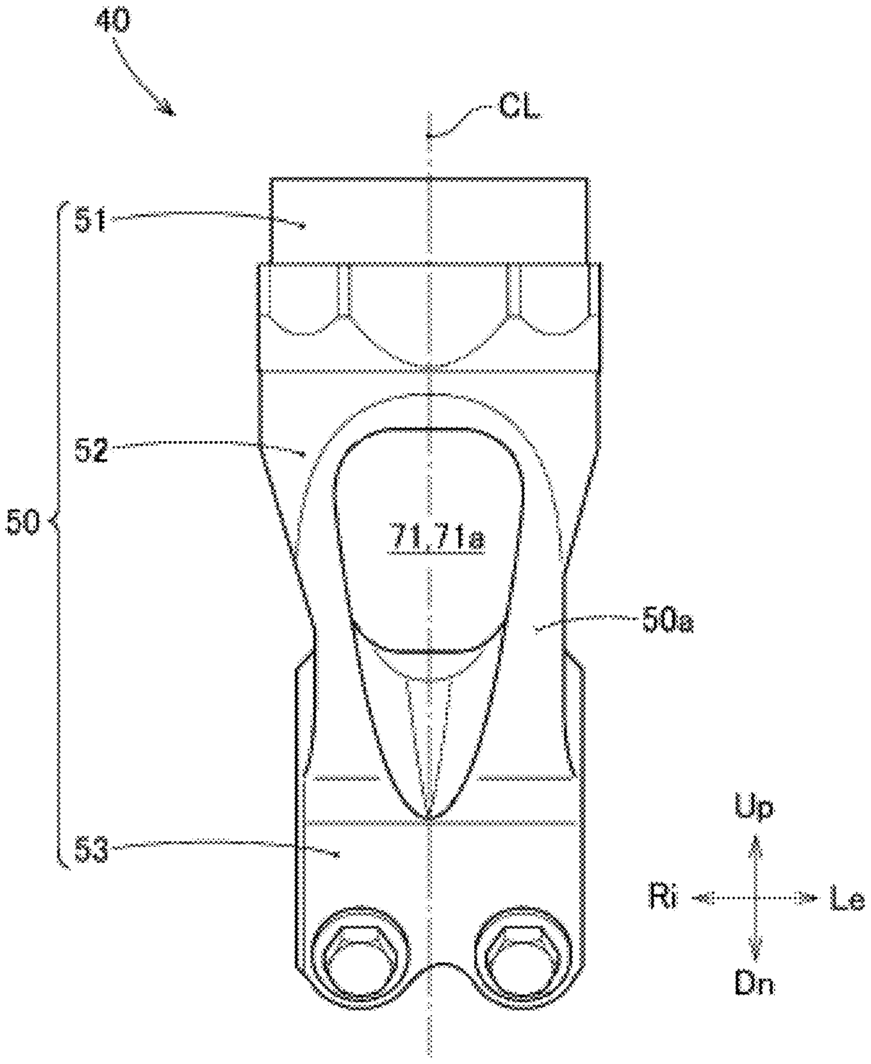
FIG. 3 is a view of a coupling portion illustrated in FIG. 2B as viewed in a direction of an arrow 3.

Reference is also made to FIG. 3. The coupling portion 50 includes a damper support portion 51 at an upper end for supporting the lower end portion 33 of the damper 30, a brake support portion 52 integrally provided at a lower end of the damper support portion 51, and an axle support portion 53 integrally provided at a lower end of the brake support portion 52. The damper support portion 51, the brake support portion 52, and the axle support portion 53 are arranged, for example, on a center line CL of the damper 30. The axle support portion 53 may be configured to be set off with respect to the center line CL of the damper 30.

The damper support portion 51 is, for example, a bottomed cylindrical portion that is open upward, and the lower end portion 33 of the damper 30 can be fitted and fixed thereto. The brake support portion 52 is a rod-shaped portion extending on the center line CL of the damper 30. The axle support portion 53 has a support hole 54 in which the axle 14*a* of the front wheel 14 (see FIG. 1) can be fitted and supported.

Figure 4A:
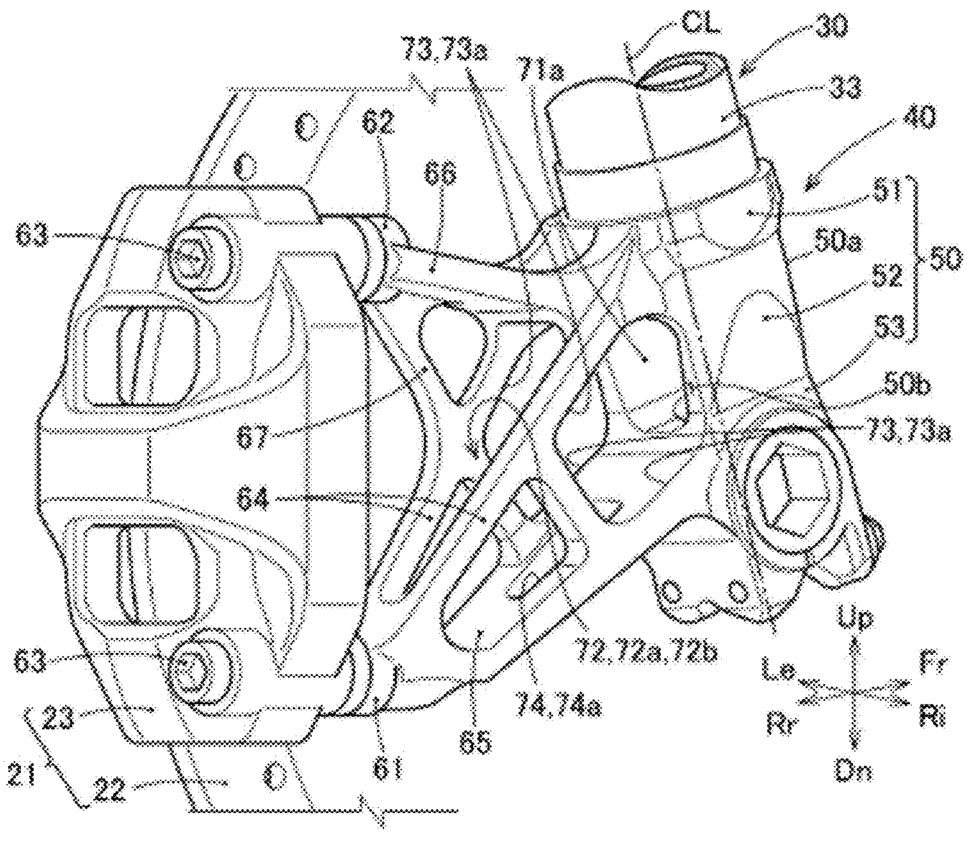
FIG. 4A is a perspective view of the configuration in which the damper and the brake caliper are assembled to the axle bracket illustrated in FIG. 2A as viewed from rear of the vehicle.
Figure 4B:
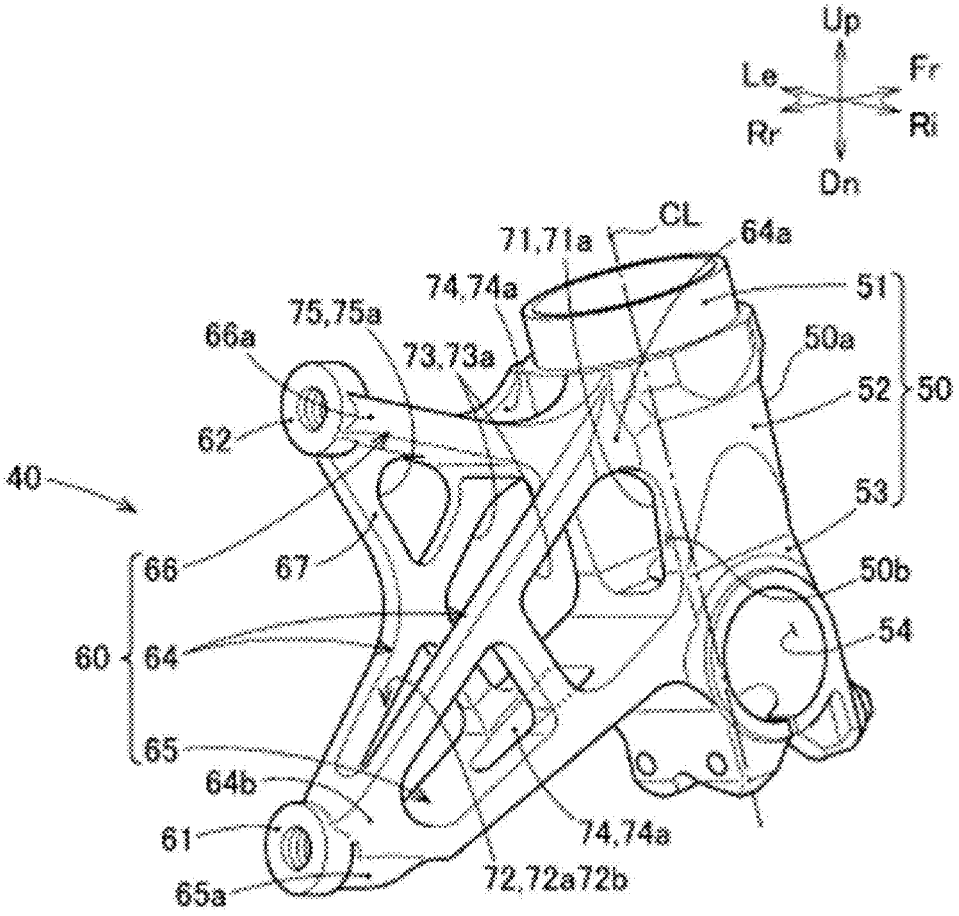
FIG. 4B is a perspective view of the single axle bracket illustrated in FIG. 4A.
Figure 5:
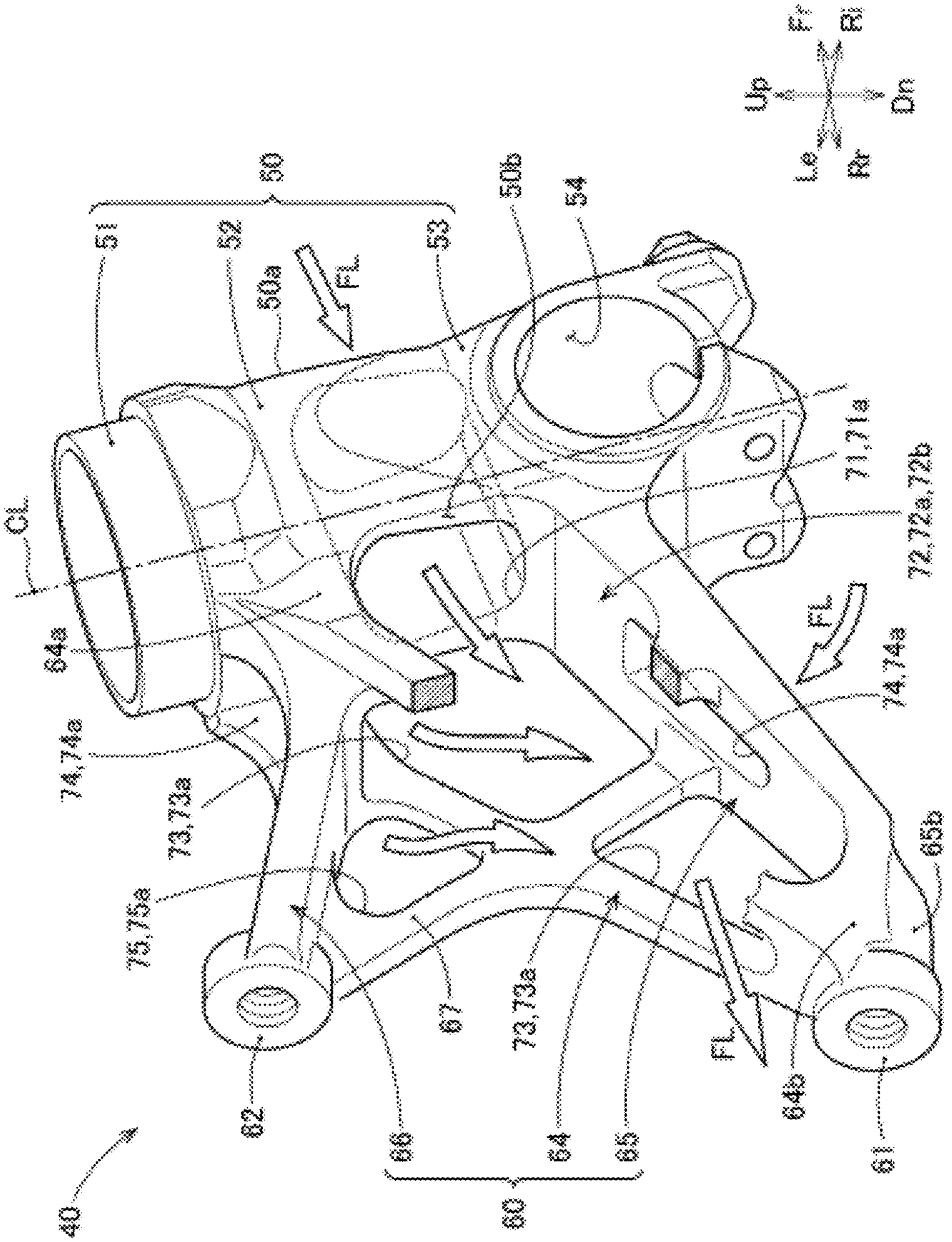
FIG. 5 is diagram in which a part of the axle bracket illustrated in FIG. 4B is omitted.

Reference is also made to FIG. 4A, FIG. 4B and FIG. 5. The brake attachment portion 60 has a V-shaped configuration that opens in the up and down direction from the coupling portion 50 toward the rear of the vehicle 10, and includes a lower attachment portion 61 and an upper attachment portion 62 at a rear end. The lower attachment portion 61 and the upper attachment portion 62 can attach the brake caliper 23 of the brake 21 by a fastening member 63 such as a bolt.

The brake attachment portion 60 includes left and right side arms 64, 64 extending from the brake support portion 52, that is, from the coupling portion 50 toward the rear of the vehicle 10, a lower arm 65 connecting lower ends of the left and right side arms 64, 64 and an upper arm 66 extending from the coupling portion 50 toward the rear of the vehicle 10.

When the axle support portion 53 is viewed from above (viewed from a direction along the center line CL of the damper 30), the left and right side arms 64, 64 are implemented in a tapered shape from the coupling portion 50 toward a rear lower side of the vehicle 10. That is, base ends 64*a*, 64*a* of the left and right side arms 64, 64 are provided on the coupling portion 50 with an interval therebetween. Rear ends 64*b*, 64*b* of the left and right side arms 64, 64 are connected to each other. The left and right side arms 64, 64 are vertical plate-like portions, and are implemented in a tapered shape from the coupling portion 50 toward the rear lower side of the vehicle 10 as viewed from the side.

The lower arm 65 is a horizontal plate-shaped portion that extends from the coupling portion 50 toward the rear of the vehicle 10 and forms a bottom plate of the brake attachment portion 60. Lower ends of the left and right side arms 64, 64 and the lower arm 65 are all connected integrally. The rear ends 64*b*, 64*b* of the left and right side arms 64, 64 and a rear end 65*a* of the lower arm 65 are integrally connected to each other, and the lower attachment portion 61 is provided.

The upper arm 66 is implemented in a horizontal plate shape extending toward the upper rear of the vehicle 10 from a base portion between the coupling portion 50 and the base ends 64*a*, 64*a* of the left and right side arms 64, 64. The upper attachment portion 62 is provided on a rear end 66*a* of the upper arm 66. A central portion in a longitudinal direction of the left side arm 64 and the rear end 66*a* of the upper arm 66 are supported by a stay 67.

The axle bracket 40 includes, at least at the coupling portion 50, an introduction portion 71 (a first introduction portion 71) capable of guiding a fluid FL, such as a traveling wind or rain water, in the front and rear direction of the vehicle 10 during traveling of the vehicle 10. The first introduction portion 71 is preferably provided in the brake support portion 52.

That is, at least the coupling portion 50 includes the first introduction portion 71 capable of guiding the traveling wind FL from a front 50*a* of the coupling portion 50 to a rear 50*b* of the coupling portion 50. The first introduction portion 71 is provided such that a path of the traveling wind FL passing through the first introduction portion 71 and the brake 21 (the brake caliper 23) intersect each other.

The first introduction portion 71 has a through hole 71*a* (a first through hole 71*a*) that penetrates in the front and rear direction of the vehicle 10 with respect to the coupling portion 50. The first through hole 71*a* is positioned on the center line CL of the damper 30. A cross-sectional area of the first through hole 71*a* is preferably as large as possible to reduce a passage resistance of the fluid FL while ensuring steering stability required for the axle bracket 40. For example, the height and width of the first through hole 71*a* are set to be large to a limit of the brake support portion 52.

Preferably, the brake attachment portion 60 includes an introduction portion 72 (a second introduction portion 72) capable of guiding the fluid FL in the front and rear direction of the vehicle 10. The second introduction portion 72 has a through hole 72*a* (a second through hole 72*a*) that penetrates in the front and rear direction of the vehicle 10 with respect to the brake attachment portion 60.

More specifically, the brake attachment portion 60 includes a space portion 72*b* surrounded by the left and right side arms 64, 64, the lower arm 65, and the upper arm 66. The space portion 72*b* communicates with the first through hole 71*a* on the coupling portion 50. Moreover, since a rear portion of the upper arm 66 is separated upward with respect to the left and right side arms 64, 64, the space portion 72*b* is opened rearward. Accordingly, the space portion 72*b* penetrates in the front and rear direction of the vehicle 10 with respect to the brake attachment portion 60, and forms the second through hole 72*a*.

More preferably, the brake attachment portion 60 includes an introduction portion 73 (a third introduction portion 73) capable of guiding the fluid FL in the left and right direction of the vehicle 10 with respect to the brake attachment portion 60. The third introduction portion 73 has a plurality of through holes 73*a* (third through holes 73*a*) that penetrate in the left and right direction of the vehicle 10 with respect to the brake attachment portion 60. More specifically, the plurality of third through holes 73*a* communicate with the second through hole 72*a* by penetrating the left and right side arms 64, 64.

Since the third through hole 73*a* penetrating in the left and right direction communicates with the second through hole 72*a* penetrating in the front and rear direction, the fluid FL introduced from the third through hole 73*a* to the second through hole 72*a* during traveling of the vehicle 10 can be guided from the second through hole 72*a* to the brake caliper 23 or the brake disc 22. As a result, temperatures of the brake caliper 23 and the brake disc 22 can be lowered more efficiently.

More preferably, the brake attachment portion 60 includes an introduction portion 74 (a fourth introduction portion 74) capable of guiding the fluid FL in the up and down direction of the vehicle 10 with respect to the brake attachment portion 60. The fourth introduction portion 74 has a through hole 74*a* (a fourth through hole 74*a*) that penetrates in the up and down direction of the vehicle 10 with respect to the brake attachment portion 60. More specifically, the fourth through hole 74*a* communicates with the second through hole 72*a* by penetrating the lower arm 65 and the upper arm 66.

Since the fourth through hole 74*a* penetrating in the up and down direction communicates with the second through hole 72*a* penetrating in the front and rear direction, the fluid FL introduced from the fourth through hole 74*a* to the second through hole 72*a* during traveling of the vehicle 10 can be guided from the second through hole 72*a* to the brake caliper 23 or the brake disc 22. As a result, temperatures of the brake caliper 23 and the brake disc 22 can be lowered more efficiently.

Furthermore, as described above, the central portion in a longitudinal direction of the left side arm 64 and a central portion in a longitudinal direction of the upper arm 66 are supported by the bar-shaped stay 67. A through hole 75*a* surrounded by the left side arm 64, the upper arm 66, and the stay 67 is referred to as a fifth through hole 75*a*. The fifth through hole 75*a* penetrates in the left and right direction of the vehicle 10 with respect to the brake attachment portion 60, and communicates with the second through hole 72*a*.

As is clear from the above description, the brake attachment portion 60 includes an introduction portion 75 (a fifth introduction portion 75) capable of guiding the fluid FL in the left and right direction of the vehicle 10 with respect to the brake attachment portion 60. The fifth introduction portion 75 has the fifth through hole 75*a* that penetrates in the left and right direction of the vehicle 10 with respect to the brake attachment portion 60.

Next, the cooling action of the brake 21 implemented by the fluid FL such as a traveling wind or rain water in the front and rear direction of the vehicle 10 during traveling of the vehicle 10 will be described. As the vehicle 10 travels, the fluid FL introduced from the first introduction portion 71 flows rearward through the second introduction portion 72 to cool the brake caliper 23 and the brake disc 22. Further, during traveling of the vehicle 10, the fluid FL introduced into the second through hole 72*a* from the third through hole 73*a*, the fourth through hole 74*a*, and the fifth through hole

75*a* flows from the second through hole 72*a* to the brake caliper 23 and the brake disc 22 to cool the brake caliper 23 and the brake disc 22.

The description of example 1 mentioned above is summarized as follows.

The axle bracket 40 includes the coupling portion 50 that couples the damper 30 to the axle 14*a*, and the brake attachment portion 60 that is provided on a rear side of the vehicle 10 with respect to the coupling portion 50 and to which the brake 21 (the brake caliper 23) is allowed to be attached. At least the coupling portion 50 includes the first introduction portion 71 capable of guiding the fluid FL (including the traveling wind FL) in the front and rear direction of the vehicle 10. That is, the first introduction portion 71 is provided so that the fluid FL present around the axle bracket 40 is not blocked by the coupling portion 50.

In other words, at least the coupling portion 50 includes the first introduction portion 71 capable of guiding the traveling wind FL from the front 50*a* of the coupling portion 50 to the rear 50*b* of the coupling portion 50. The first introduction portion 71 is provided such that the path of the traveling wind FL passing through the first introduction portion 71 (a direction in which the traveling wind FL flows from the front side to the rear side of the vehicle 10) and the brake 21 (the brake caliper 23) intersect each other.

Therefore, a part of the fluid FL present around the axle bracket 40, which is represented by the traveling wind generated during traveling of the vehicle 10, such as a saddle-riding vehicle, can be introduced from the first introduction portion 71 to allow the fluid FL to flow directly to the brake 21. As a result, the brake 21 can be efficiently cooled in the axle bracket 40 including the coupling portion 50 that couples the damper 30 to the axle 14*a* and the brake attachment portion 60 to which the brake 21 (the brake caliper 23) is allowed to be attached. Moreover, a sufficient brake cooling effect can be achieved without providing an air duct around the axle bracket 40.

Further, the first introduction portion 71 has the first through hole 71*a* that penetrates in the front and rear direction of the vehicle 10 with respect to the coupling portion 50. Therefore, the first introduction portion 71 has a simple configuration in which the coupling portion 50 only has the through hole 71*a*. It is possible to easily achieve both ensuring the strength and reducing the weight of the axle bracket 40 and cooling the brake 21 at the same time.

Further, the brake attachment portion 60 includes the second introduction portion 72 capable of guiding the fluid FL in the front and rear direction of the vehicle 10. Therefore, although the brake attachment portion 60 that prevents the flow of the fluid FL is positioned behind the coupling portion 50, the fluid FL introduced from the first introduction portion 71 can be efficiently caused to flow to the brake 21 through the second introduction portion 72. Accordingly, the brake 21 can be efficiently cooled. Moreover, the appearance of the axle bracket 40 can be improved.

Further, the second introduction portion 72 has the second through hole 72*a* that penetrates in the front and rear direction of the vehicle 10 with respect to the brake attachment portion 60. Therefore, the second introduction portion 72 can have a simple configuration including only the second through hole 72*a*.

Further, the brake attachment portion 60 includes the third through hole 73*a* (the third introduction portion 73) that penetrates in the left and right direction of the vehicle 10 with respect to the brake attachment portion 60. The third through hole 73*a* communicates with the second through hole 72*a*. Therefore, the fluid FL can be introduced more efficiently.

Further, the front fork 13 for a saddle-riding vehicle includes the axle bracket 40 including at least the first introduction portion 71. Therefore, the brake 21 can be cooled only by the axle bracket 40 without providing a cooling member such as an air duct around the axle bracket 40. Moreover, since it is unnecessary to provide another cooling member, it is possible to improve the flexibility of the design of the front fork 13 for a saddle-riding vehicle and to improve the appearance of the front fork 13.

Next, axle brackets 140 to 740 of the other examples will be described. The axle brackets 140 to 740 of the other examples have the same basic configuration as the axle bracket 40 of example 1. Components common to the axle bracket 40 are denoted by the same reference numerals, and detailed description thereof is omitted.

Example 2

The axle bracket 140 of example 2 will be described with reference to FIG. 6.

Figure 6:
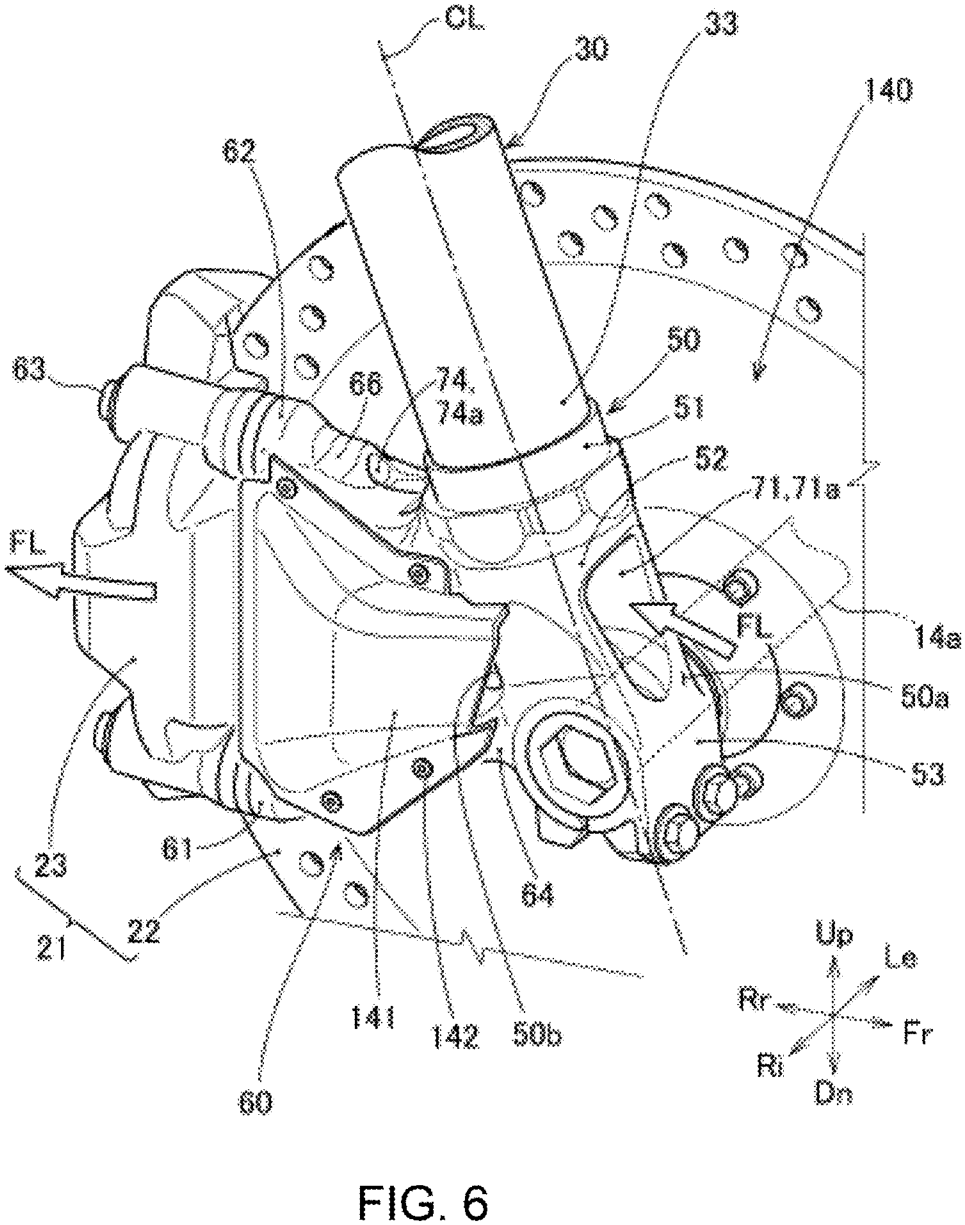
FIG. 6 is a perspective view of a configuration in which a damper and a brake caliper are assembled to an axle bracket according to example 2.

FIG. 6 is a perspective view illustrating the axle bracket 140 of example 2, and corresponds to FIG. 2A illustrating the axle bracket 40 of example 1. The axle bracket 140 includes a cover 141 that covers a side of the brake attachment portion 60.

The cover 141 preferably covers the whole or a part of at least one side of the brake attachment portion 60, for example, an entire side opposite to the brake disc 22. The cover 141 is detachably attached to the brake attachment portion 60 by a fastening member 142 such as a screw. Due to the provision of the cover 141, the fluid FL introduced from the first introduction portion 71 is regulated in order not to diffuse outward in a vehicle width direction, and can more actively flow to the brake 21 (the brake caliper 23). As a result, the brake 21 can be efficiently cooled.

Example 3

The axle bracket 240 of example 3 will be described with reference to FIG. 7.

Figure 7:
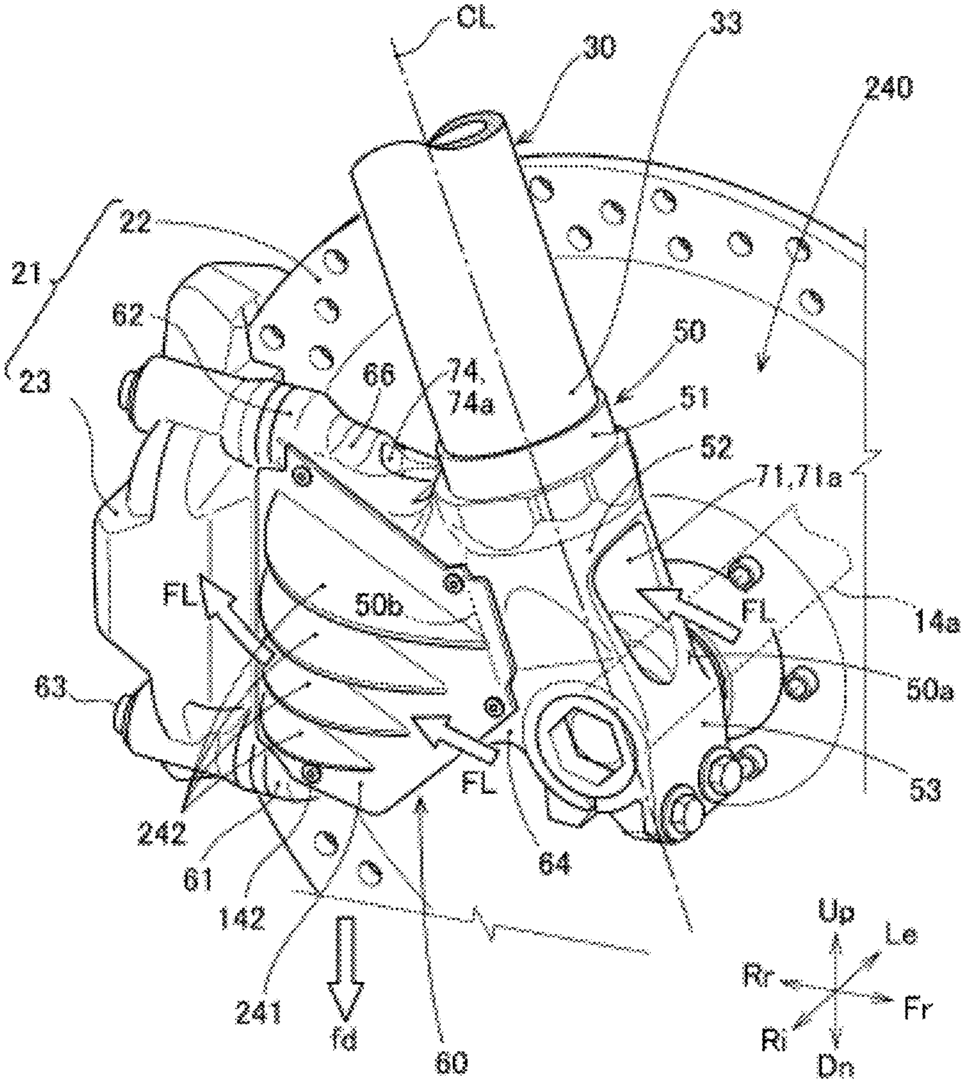
FIG. 7 is a perspective view of a configuration in which a damper and a brake caliper are assembled to an axle bracket according to example 3.

FIG. 7 is a perspective view illustrating the axle bracket 240 of example 3, and corresponds to FIG. 6 illustrating the axle bracket 140 of example 2. In the axle bracket 240 of example 3, a cover 241 includes at least one (for example, a plurality of) induction fin 242 capable of guiding the fluid FL flowing along the cover 241 from the front to the upper rear of the vehicle 10. A configuration of the cover 241 itself is the same as a configuration of the cover 141 of example 2.

The plurality of induction fins 242 are plate-shaped members whose plates face the up and down direction and extend outward in the vehicle width direction from an outer surface of the cover 241. Further, the plurality of induction fins 242 are arranged at a fixed interval in the up and down direction with respect to the outer surface of the cover 241, and are provided integrally with or separately from the cover 241.

The induction fins 242 are inclined upward from the front side toward the rear side of the cover 241. Therefore, the traveling wind FL (the fluid FL) generated during traveling of the motorcycle 10 is guided by the induction fins 242 and flows rearward and upward. As a result, a down force fd can be applied to a front portion of the vehicle body 11. For example, even when the motorcycle 10 is accelerated, a stable ground contact feeling can be obtained in the front portion of the vehicle body 11, and the steering stability can be improved.

Example 4

The axle bracket 340 of example 4 will be described with reference to FIG. 8.

Figure 8:
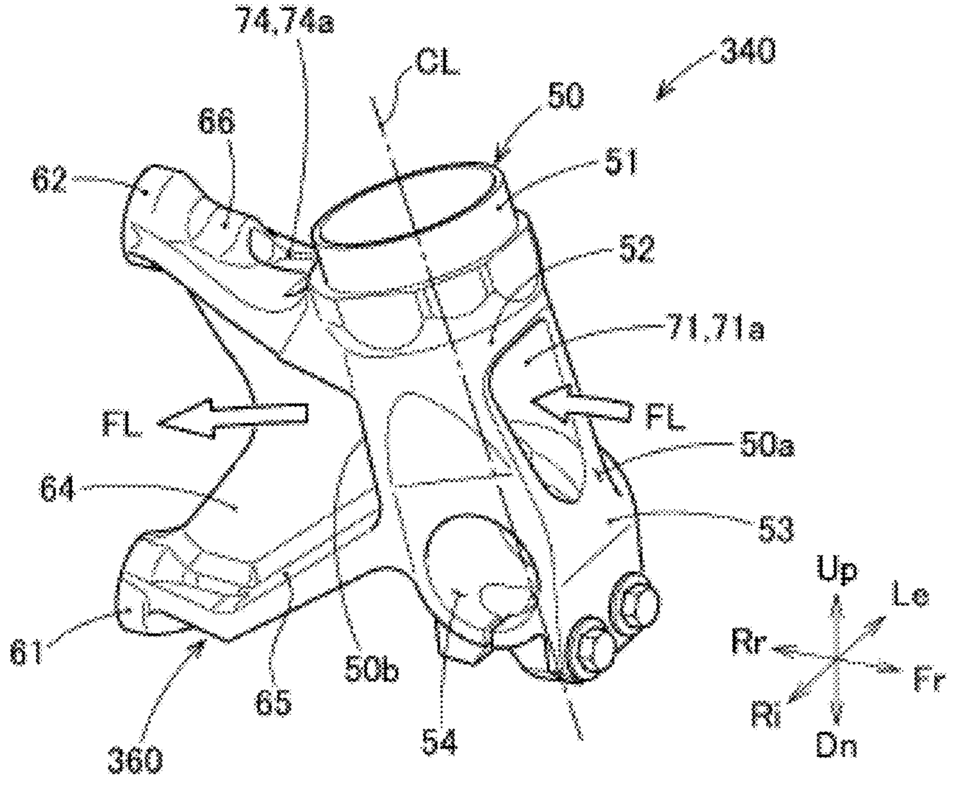
FIG. 8 is a perspective view of an axle bracket according to example 4.

FIG. 8 is a perspective view illustrating the axle bracket 340 of example 4, and corresponds to FIG. 2B illustrating the axle bracket 40 of example 1. In the axle bracket 340, the side arm 64 (see FIG. 2A and FIG. 2B) opposite to the brake disc 22 in a brake attachment portion 360 is eliminated. Further, the axle bracket 340 does not include the third introduction portion 73 (see FIG. 2B) in the side arm 64 on the brake disc 22 side.

Example 5

The axle bracket 440 of example 5 will be described with reference to FIG. 9.

Figure 9:
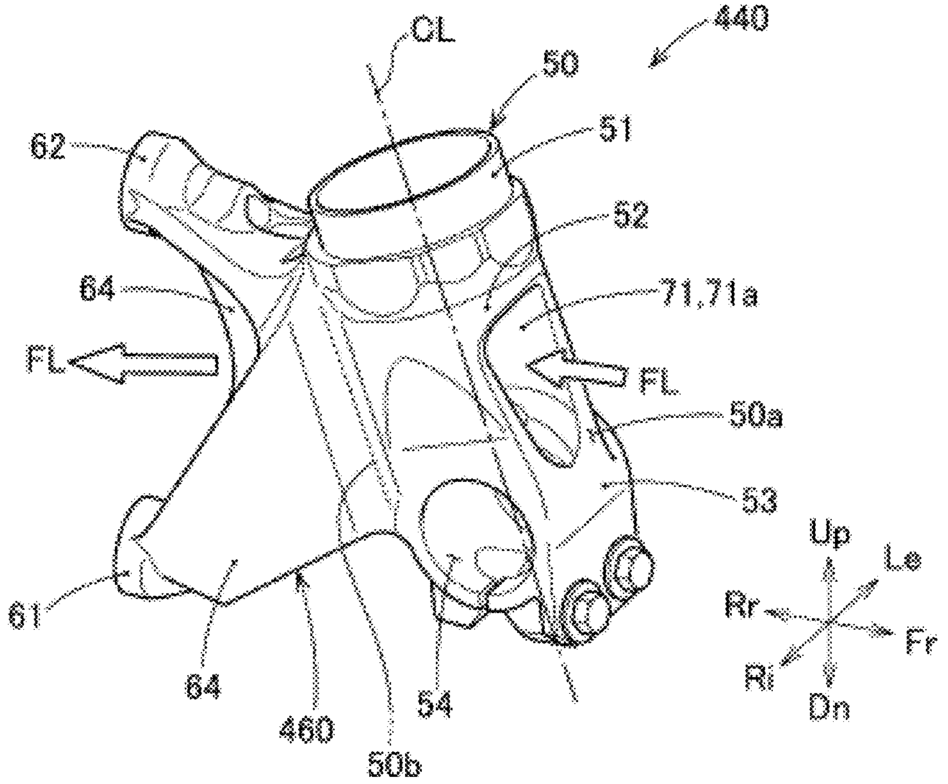
FIG. 9 is a perspective view of an axle bracket according to example 5.

FIG. 9 is a perspective view illustrating the axle bracket 440 of example 5, and corresponds to FIG. 2B illustrating the axle bracket 40 of example 1. The axle bracket 440 does not include the third introduction portion 73 (see FIG. 2B) in the left and right side arms 64 in a brake attachment portion 460.

Example 6

The axle bracket 540 of example 6 will be described with reference to FIG. 10A and FIG. 10B.

Figure 10A:
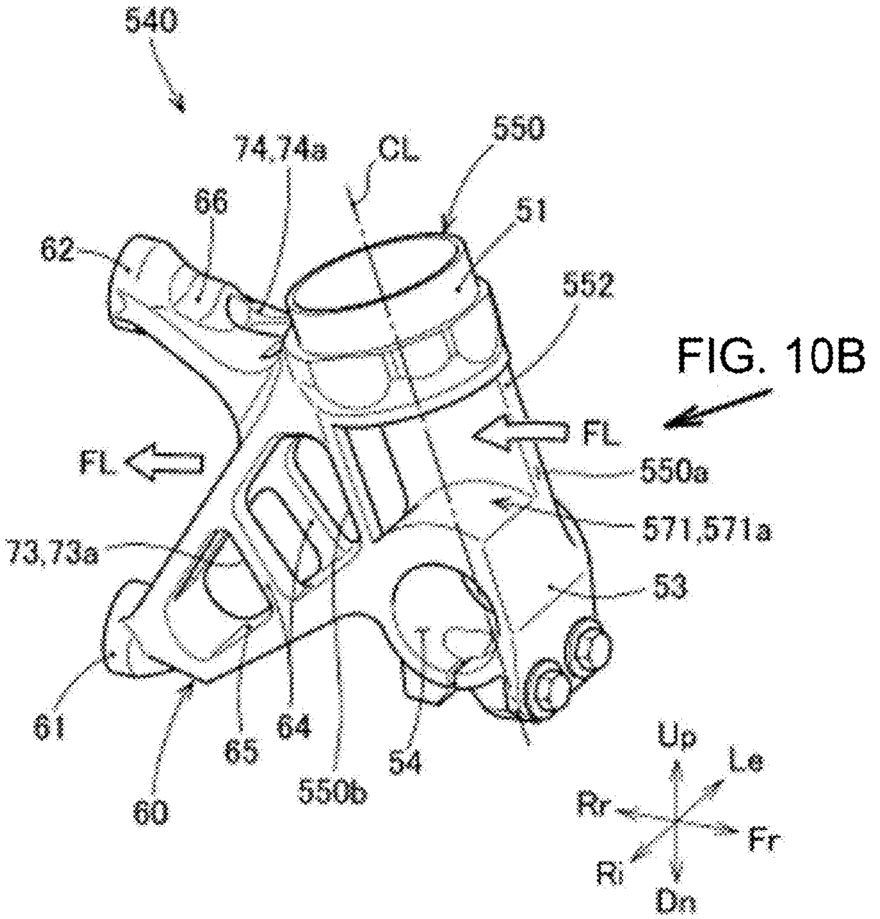
FIG. 10A is a perspective view of an axle bracket according to example 6.

FIG. 10A is a perspective view illustrating the axle bracket 540 of example 6, and corresponds to FIG. 2B illustrating the axle bracket 40 of example 1. FIG. 10B is a diagram of the axle bracket 540 illustrated in FIG. 10A as viewed in a direction of an arrow 10B.

The axle bracket 540 is characterized by a configuration of a first introduction portion 571 positioned in a brake support portion 552 of a coupling portion 550. The first introduction portion 571 has a first through hole 571*a* (a first recess 571*a*) formed by cutting out a left side Le or a right side Ri of the brake support portion 552. That is, the first through hole 571*a* is a cutout hole, and corresponds to the first through hole 71*a* of example 1 illustrated in FIG. 2A. Therefore, as illustrated in FIG. 10B, the brake support portion 552 has an L-shape in a front view.

In other words, at least the coupling portion 550 includes the first introduction portion 571 capable of guiding the traveling wind FL from a front 550*a* of the coupling portion 550 to a rear 550*b* of the coupling portion 550. The first introduction portion 571 is provided such that a path of the traveling wind FL passing through the first introduction portion 571 (a direction in which the traveling wind FL flows from a front side to a rear side of the vehicle 10) and the brake 21 (see FIG. 2A) intersect each other. The first introduction portion 571 is open at least on one end side in a left and right direction Le and Ri of the vehicle 10 (see FIG. 1), and includes the first recess 571*a* (the first through hole 571*a* formed by cutting out a lateral side) that is recessed from the one end side toward the other end side. Since the first recess 571*a*, which serves as the path of the traveling wind FL, is provided on the lateral side of the coupling portion 550, and when the coupling portion 550 is formed as a cast product, the coupling portion 550 can be molded by a left and right extraction mold as in the related art, and as a result, a production cost of the axle bracket 540 can be reduced.

Example 7

The axle bracket 640 of example 7 will be described with reference to FIG. 11A and FIG. 11B.

Figure 11A:
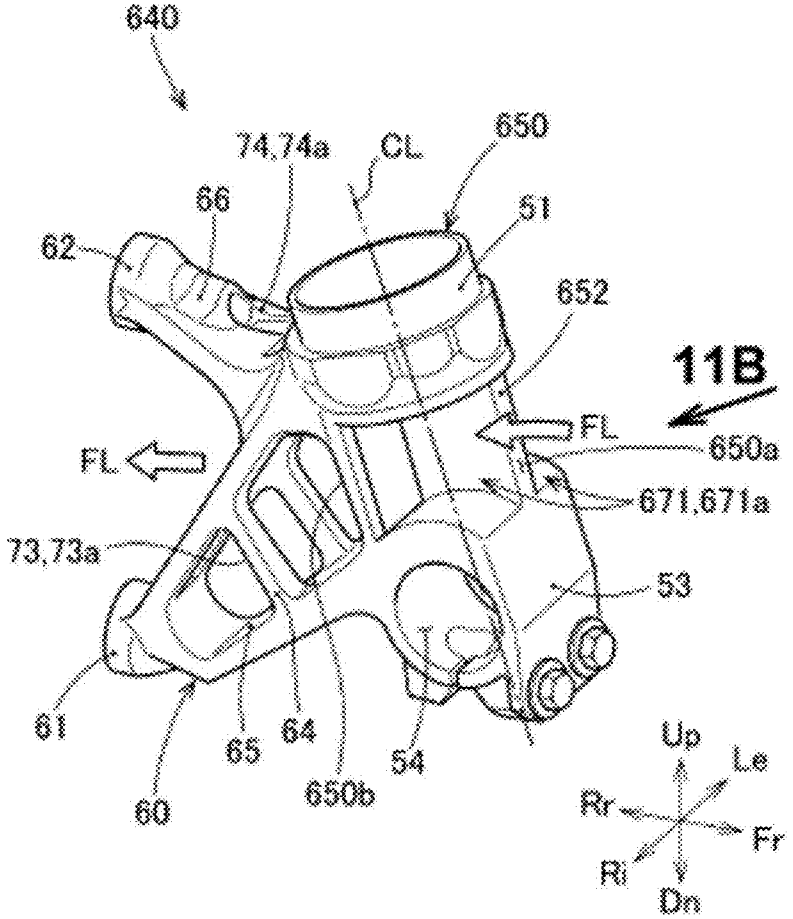
FIG. 11A is a perspective view of an axle bracket according to example 7.
Figure 11B:
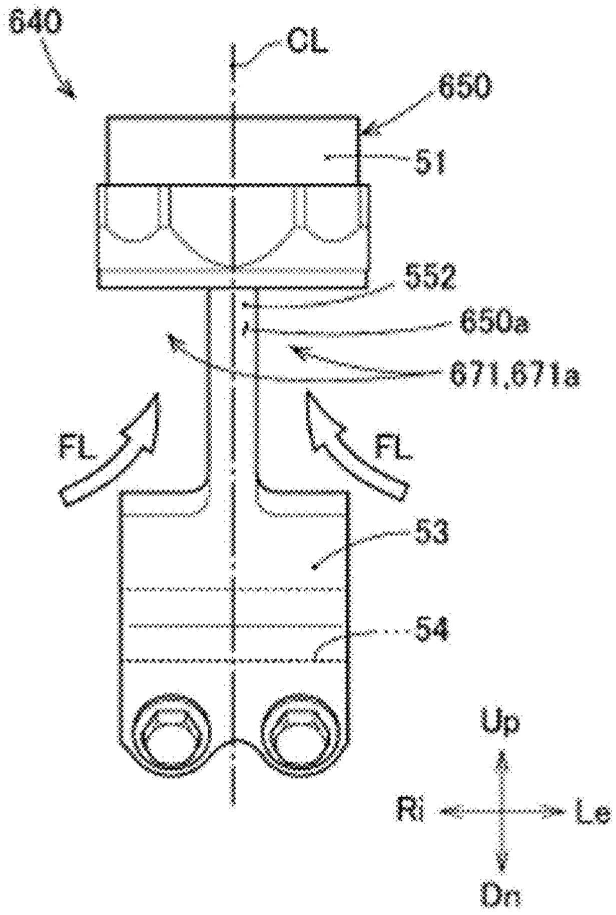
FIG. 11B is a diagram of the axle bracket illustrated in FIG. 11A as viewed in a direction of an arrow 11B.

FIG. 11A is a perspective view illustrating the axle bracket 640 of example 7, and corresponds to FIG. 10A illustrating the axle bracket 540 of example 6. FIG. 11B is a diagram of the axle bracket 640 illustrated in FIG. 11A as viewed in a direction of an arrow 11B.

The axle bracket 640 is characterized by a configuration of two first introduction portions 671, 671 positioned on the left and right Le, Ri of a brake support portion 652 of a coupling portion 650. The first introduction portions 671, 671 have first through holes 671*a*, 671*a* formed by cutting out both sides of the brake support portion 652. That is, the first through holes 671*a*, 671*a* are cutout holes, and corresponds to the first through hole 571*a* (the first recess 571*a*) of example 6 illustrated in FIG. 10A. Therefore, as illustrated in FIG. 11B, the brake support portion 552 has an I-shape in a front view.

In other words, at least the coupling portion 650 includes the first introduction portions 671, 671 capable of guiding the traveling wind FL from a front 650*a* of the coupling portion 650 to a rear 650*b* of the coupling portion 650. The first introduction portions 671, 671 are provided such that a path of the traveling wind FL passing through the first introduction portions 671, 671 (a direction in which the traveling wind FL flows from a front side to a rear side of the vehicle 10) and the brake 21 (see FIG. 2A) intersect each other. The first introduction portions 671, 671 open on both sides in a left and right direction Le and Ri of the vehicle 10 (see FIG. 1), and include first recesses 671*a*, 671*a* (the first through holes 671*a*, 671*a* formed by cutting out lateral sides) that are recessed from both sides of the left and right Le and Ri toward the center. Since the first recesses 671*a*, 671*a*, which serve as the path of the traveling wind FL, are provided on the lateral side of the coupling portion 650, and when the coupling portion 650 is formed as a cast product, the coupling portion 650 can be molded by a left and right extraction mold as in the related art, and as a result, a production cost of the axle bracket 640 can be reduced.

Example 8

The axle bracket 740 of example 8 will be described with reference to FIGS. 12 to 14.

Figure 10B:
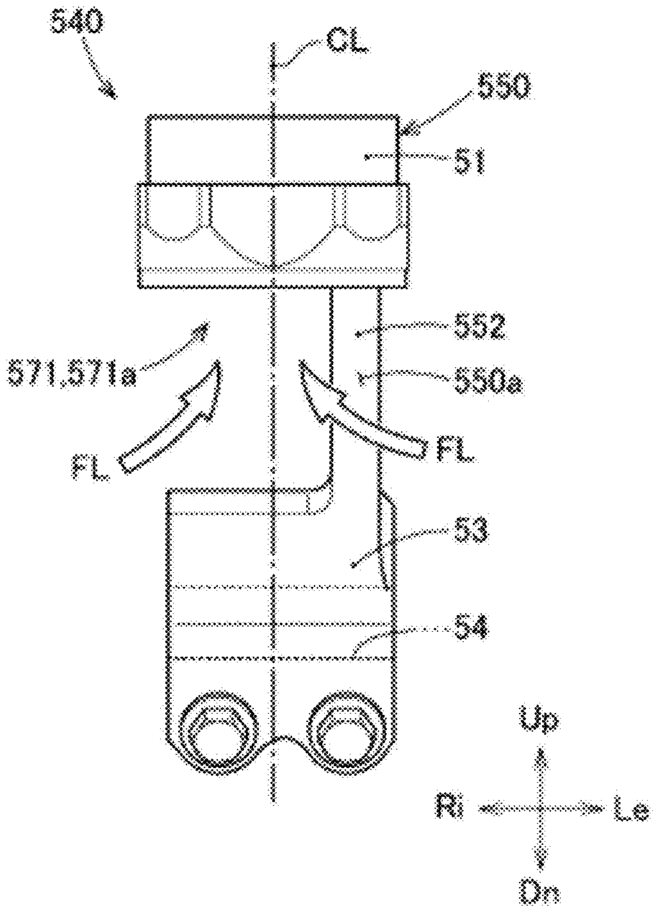
FIG. 10B is a diagram of the axle bracket illustrated in FIG. 10A as viewed in a direction of an arrow 10B.
Figure 12:
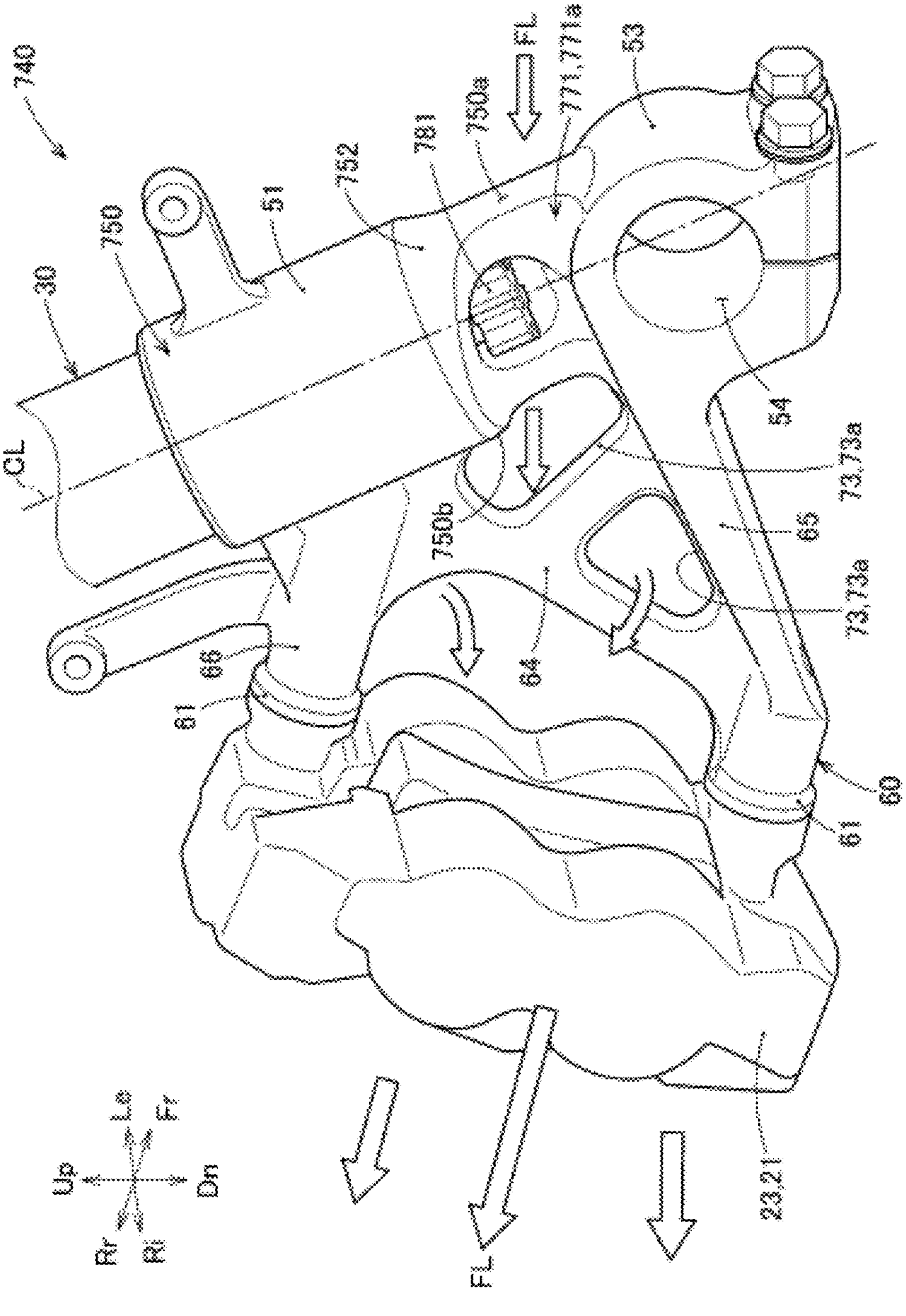
FIG. 12 is a perspective view of a configuration in which a damper and a brake caliper are assembled to an axle bracket according to example 8.

FIG. 12 is a perspective view illustrating the axle bracket 740 of example 8, and corresponds to FIG. 10A and FIG. 10B illustrating the axle bracket 540 of example 6. FIG. 13 is a perspective view of the single axle bracket illustrated in FIG. 12.

In the axle bracket 740, one side arm 64 (see FIG. 10A) of the brake attachment portion 60 is eliminated. The axle bracket 740 is characterized by a configuration of a first introduction portion 771 positioned in a brake support portion 752 of a coupling portion 750.

The first introduction portion 771 has a first through hole 771*a* (a first recess 771*a*) formed by cutting out a left side Le or a right side Ri of the brake support portion 752. That is, the first through hole 771*a* is a cutout hole. Therefore, the brake support portion 752 has an L-shape in a front view.

In other words, at least the coupling portion 750 includes the first introduction portion 771 capable of guiding the traveling wind FL from a front 750_a_ of the coupling portion 750 to a rear 750_b_ of the coupling portion 750. The first introduction portion 771 is provided such that the path of the traveling wind FL passing through the first introduction portion 771 (a direction in which the traveling wind FL flows from the front side to the rear side of the vehicle 10) and the brake 21 (the brake caliper 23) intersect each other.

As described above, the first introduction portion 771 is open at least on one end side in a left and right direction Le and Ri of the vehicle 10 (see FIG. 1), and includes the first recess 771_a_ (the first through hole 771_a_ formed by cutting out a lateral side) that is recessed from the one end side toward the other end side. Since the first recess 771_a_, which serves as the path of the traveling wind FL, is provided on the lateral side of the coupling portion 750, and when the coupling portion 750 is formed as a cast product, the coupling portion 750 can be molded by a left and right extraction mold as in the related art, and as a result, a production cost of the axle bracket 740 can be reduced.

Figure 13:
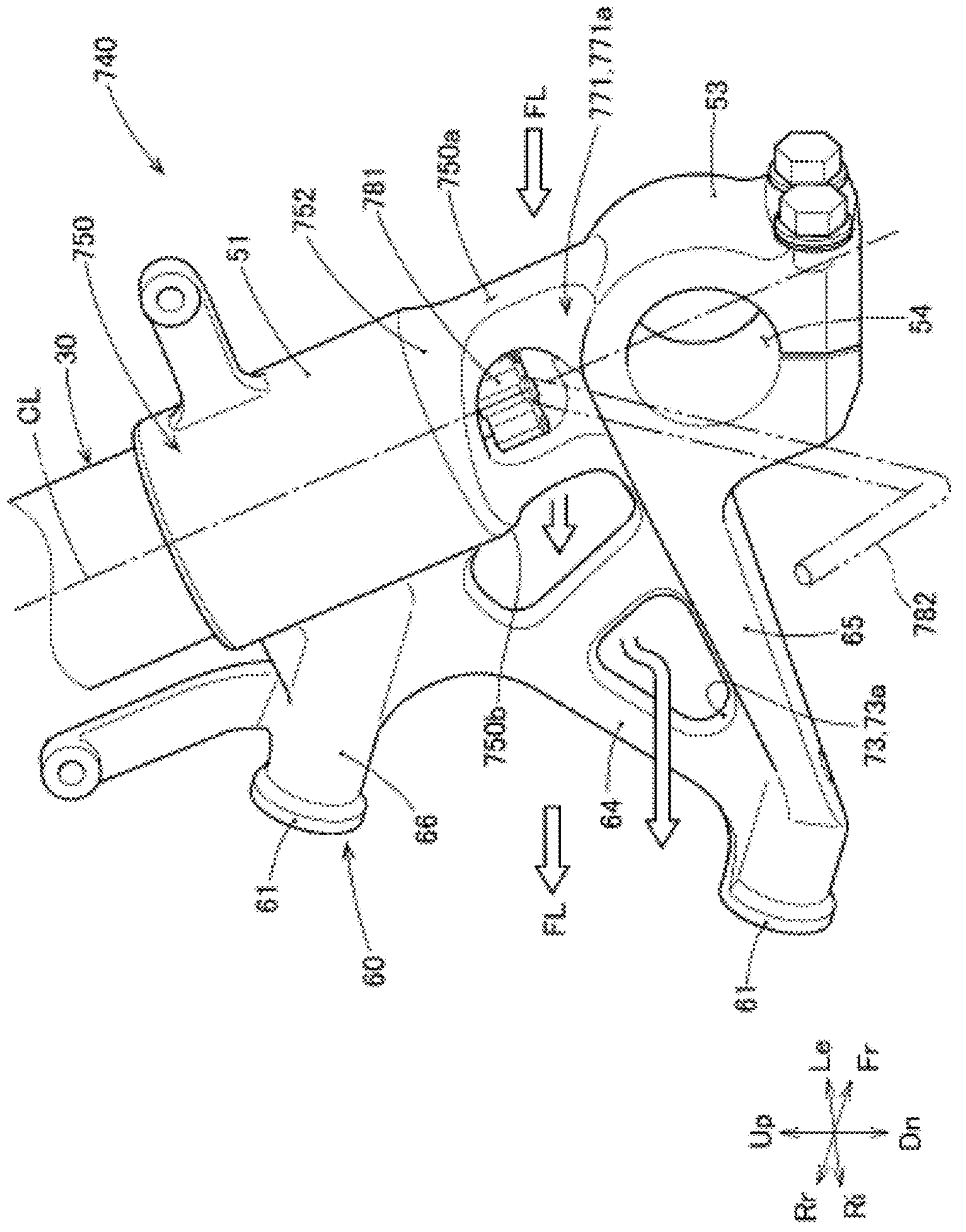
FIG. 13 is a perspective view of the single axle bracket illustrated in FIG. 12.
Figure 14:
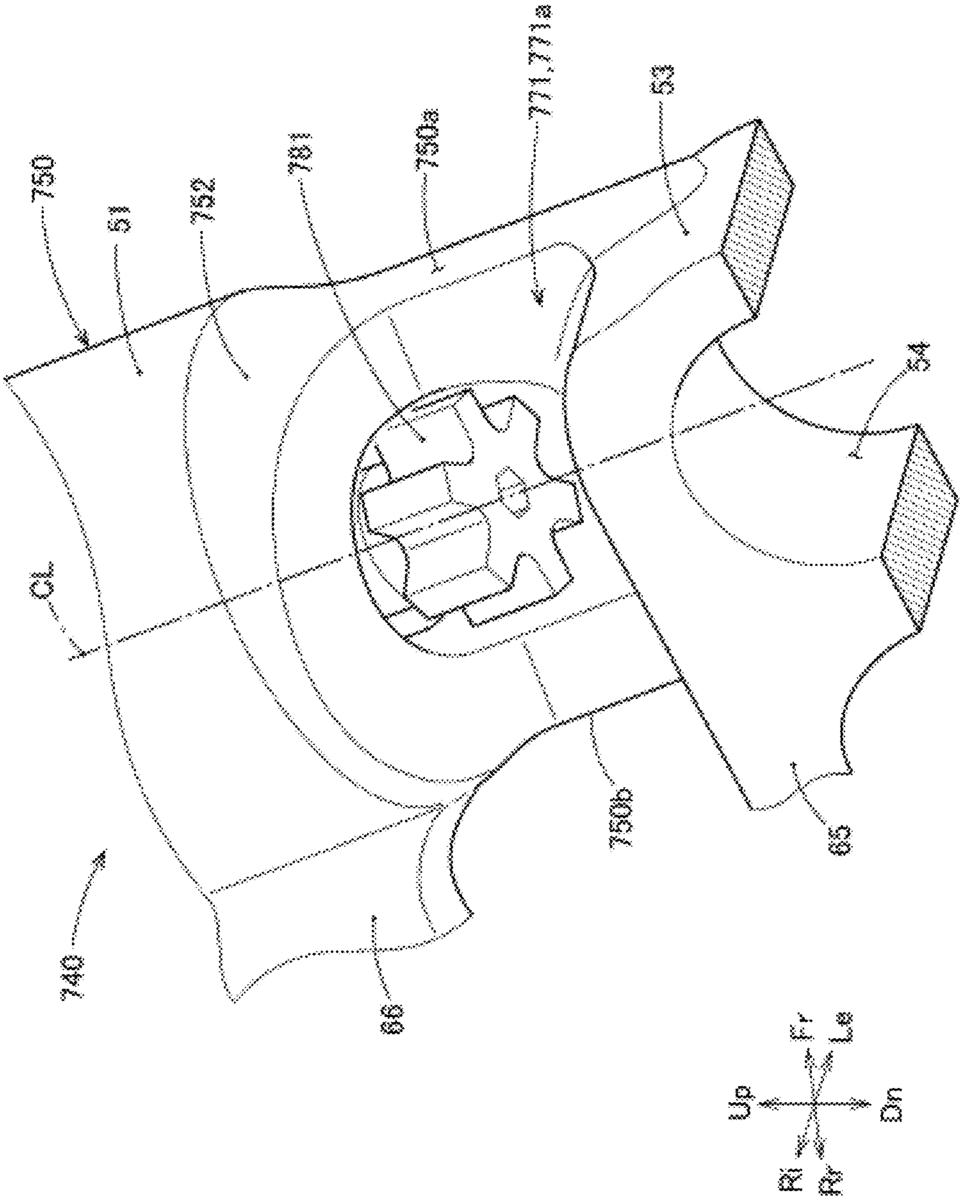
FIG. 14 is a perspective view around a first recess of the axle bracket illustrated in FIG. 13.

As illustrated in FIGS. 13 and 14, a damping force adjustment dial 781, which is a damping force adjustment mechanism (not illustrated) for adjusting a damping force of the damper 30 is positioned in the first recess 771_a_ of the axle bracket 740. The damping force of the damping force adjustment mechanism can be adjusted by turning a tool 782 on the damping force adjustment dial 781. By inserting the tool 782 into the first recess 771_a_, the damping force adjustment dial 781 can be easily turned, and as a result, the adjustment work is easy.

The axle brackets 40 to 740 and the front fork 13 for a saddle-riding vehicle provided with the axle brackets 40 to 740 according to the present invention are not limited to the above examples described above as long as the functions and effects of the present invention are exhibited.

For example, although the example in which the brake 21 is disposed only on one side of the front wheel 14 in the vehicle 10 has been described, the brake 21 may be disposed on both sides of the front wheel 14. In this case, the axle brackets 40 to 740 according to the present invention are provided in the left and right dampers 30, 30 of the front fork 13.

The brake 21 is not limited to the disc brake, and may be, for example, a drum brake.

Each of the coupling portions 50, 550, 650, and 750 may include an intake duct capable of intaking the fluid FL (including the traveling wind FL) from the front of the vehicle 10. The intake duct communicates with the front portions of the first through holes 71_a_, 571_a_, and 671_a_.

A front fender may be provided with a fluid introduction portion capable of intaking the fluid FL (including the traveling wind FL) from the front of the vehicle 10. The fluid introduction portion is connected to the first through holes 71_a_, 571_a_, 671_a_, and 771_a_ of the coupling portions 50, 550, 650, and 750.

The axle brackets 40 to 740 and the front fork 13 including the axle brackets 40 to 740 according the present invention are suitable for being mounted on a saddle-riding vehicle.

The invention claimed is:

1. An axle bracket comprising:
a coupling portion configured to couple a damper to an axle; and
a brake attachment portion provided on a rear side of a vehicle with respect to the coupling portion, and to which a brake is allowed to be attached,
wherein at least the coupling portion includes a first introduction portion configured to guide a traveling wind from a front of the coupling portion to a rear of the coupling portion, and
the first introduction portion is provided such that a path of the traveling wind passing through the first introduction portion intersects with the brake.

2. The axle bracket according to claim 1,
wherein the first introduction portion has a first through hole that penetrates the coupling portion in a front and rear direction of the vehicle.

3. The axle bracket according to claim 1,
wherein the brake attachment portion includes a second introduction portion configured to guide the traveling wind in a front and rear direction of the vehicle.

4. The axle bracket according to claim 3,
wherein the second introduction portion has a second through hole that penetrates the brake attachment portion in the front and rear direction of the vehicle.

5. The axle bracket according to claim 1, further comprising:
a cover configured to cover a side of the brake attachment portion.

6. The axle bracket according to claim 5,
wherein the cover includes an induction fin configured to guide the traveling wind flowing along the cover from a front to an upper rear of the vehicle.

7. The axle bracket according to claim 1,
wherein the first introduction portion includes a first recess that is open on at least one end side in a left and right direction of the vehicle and is recessed from the one end side toward an other end side.

8. A front fork for a saddle-riding vehicle, comprising:
the axle bracket according to claim 1.

* * * * *